Oct. 27, 1970   F. DESVIGNES   3,536,917
DEVICE FOR MAKING VISIBLE TEMPERATURE DIFFERENCES OF AN OBJECT
Filed Feb. 19, 1968

INVENTOR.
FRANCOIS DESVIGNES
BY
AGENT

United States Patent Office 3,536,917
Patented Oct. 27, 1970

3,536,917
DEVICE FOR MAKING VISIBLE TEMPERATURE DIFFERENCES OF AN OBJECT
Francois Desvignes, Millet-Bourg-la-Reine, France, assignor, by mesne assignments, to U.S. Philips Corporation, New York, N.Y., a corporation of Delaware
Filed Feb. 19, 1968, Ser. No. 706,246
Claims priority, application France, Feb. 20, 1967, 95,585
Int. Cl. G01j 3/46
U.S. Cl. 250—83.3                                9 Claims

ABSTRACT OF THE DISCLOSURE

An infrared radiation detection system having a row of infrared detectors and optical scanning means for focusing infrared radiation from a target area onto the detectors. A modulator mounted in a constant temperature container is interposed between the optical scanner and the detectors to chop the received radiation. The modulator also acts as a radiation reference source by alternately supplying a fixed quantity of infrared radiation to the detectors. A visible image of the infrared target image can be obtained by coupling the output of the infrared detectors to a group of electroluminescent diodes that are optically scanned in synchronism with the infrared scanning of the target area.

---

This invention relates to an infrared radiation detection system. More particularly, the invention relates to an improved device for making visible temperature differences of an object comprising a modulator, which modulates the infrared radiation emanating from the object, the modulated radiation striking a row of infrared radiation sensitive detectors. The device further comprises a radiation source which supplies a known quantity of infrared radiation to the detectors such that the detectors are alternatively struck by the radiation from the object and by that from the radiation source.

Such a device is known, for instance, from "Electronic Design" of 6th December 1961. The known device comprises essentially a flat mirror oscillating along two orthogonal axes for scanning the infrared object (which may be a landscape).

The infrared radiation is projected through a conventional optical system onto the detector via a small concave mirror having an aperture. The oscillation of this mirror provides a means for chopping the infrared flux and of passing alternately the infrared radiation from the object and the radiation of a calibrated source. This results in an alternating signal proportional to the difference between the known radiation and the unknown radiation. After amplification, the signals emanating from the object, now expressed in volts per watt of invisible light of radiation, excite a source of visible radiation, which reproduces the infrared image as a visible image by means of a suitable optical device connected with the flat scanning mirror.

From United States Pat. 2,958,802 apparatus are known in which photo-conductive cells are disposed in a vertical row and a stationary concave mirror focuses the image in the plane formed by the selective surfaces of the cells by way of a plane mirror oscillating about a vertical axis. The vertical analysis of the object is performed by the row of cells and the object is scanned horizontally by the oscillations of the plane mirror. A second plane mirror, connected with the former, provides a means for reproducing the infrared image in the form of visible radiation in an identical optical system, in which the detectors are replaced by incandescent lamps. Each detector is connected to a lamp which occupies a similar position in the reproducing device and the information obtained from the detector varies the light intensity of the lamp concerned. Such an apparatus does not provide a means for measuring the temperature or of determining the level of the received signal.

Other apparatus are known from British patent specification 922,779, in which a spherical mirror receives the infrared radiation from the object. The detector is arranged in the focus of the mirror and is stationary. The object is scanned, for example, by the oscillations of a spherical mirror and of a plane mirror along orthogonal axes. A modulator, formed by a cogged disc rotated by a motor, is arranged in front of the opening of the apparatus and cuts off part of the infrared radiation from the source. The modulation frequency is fairly high. The signals produced by the modulated radiation and the non-modulated radiation are processed in electronic means for reproducing the infrared image of the scanned object on a television screen as visible light. This apparatus requires a comparatively complicated electronic arrangement and provides only relative information about the temperature.

It is an object of the invention to provide a device of the above-mentioned kind of simple structure, which allows an accurate measurement to be made of the isotherms of a body radiating in the infrared range.

Therefore, the device according to the invention is characterized in that the radiation source is the modulator itself, which is arranged in a space in which a constant temperature is maintained.

According to one aspect of the invention, a known quantity of radiation is added to the radiation of the object. The radiation emanating from the object, however, can be reduced by an optical attenuator arranged in the path of the radiation.

In doing so, the difference between the unknown radiation and that from the radiation source can be given a suitable value which is adapted to the evaluation devices connected to the detectors.

The device for reproducing the infrared image as a visible image comprises, for example, two sequences of electro-luminescent diodes, each sequence emitting in a different spectral range and being excited selectively by the electronic evaluation devices.

The invention will now be described more fully with reference to the accompanying drawings, in which.

Figure 1:
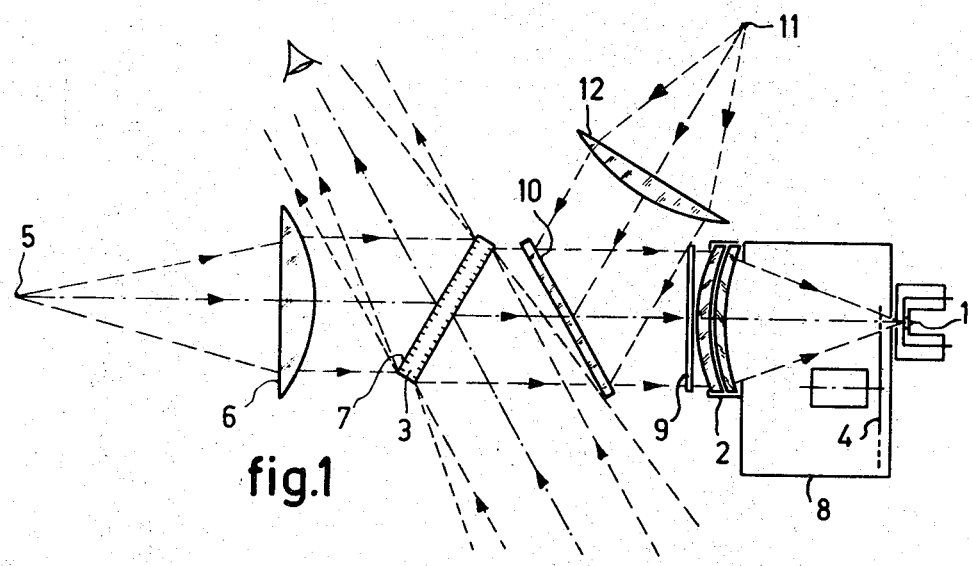
FIG. 1 shows the diagram of the apparatus according to the invention (in a projection onto a horizontal plane).
Figure 3:
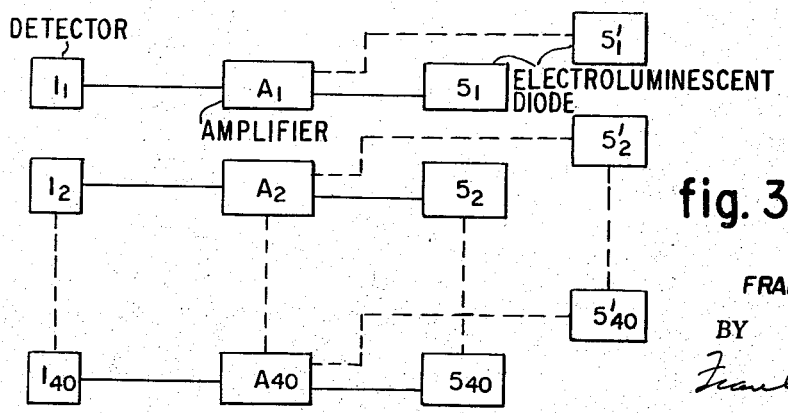
FIG. 3 is a block diagram showing the arrangement of the photoelectric detectors and the electroluminescent diodes utilized in the apparatus of FIG. 1.

In the device of FIG. 1, the infrared radiation emitted by the object to be examined (not shown) is observed by a receiver 1, e.g. comprising 40 photo-electric detectors $1_1$—$1_{40}$ composed of indium antimonide arranged in a vertical line at right angles to the plane of the drawing, as shown in FIG. 3. These detectors occupy a height of about 20 mms.

The row of photo-sensitive detectors is optically coupled to the object by means of an appropriate system 2. Between the object and the objective system 2, at a small distance from the latter, a plane mirror 3 oscillates about a vertical axis and performs a sinusoidal movement with an amplitude of about ±0.075 radians at a frequency of 15 c./s. In this way an angular field of ±0.10 radians in the vertical sense and ±0.15 radians in the horizontal sense is scanned. The image thus comprises 2400 resolved elements, scanned 30 times a second.

The sinusoidal scanning of the mirror 3 at a comparatively low speed gives rise to some difficulties with respect to the transmission of very low frequencies and to the fixation of the level of each line. These difficulties are obviated inter alia by chopping the signal by means of a cogged disc 4 having, e.g. 40 cogs and a diameter of, e.g. 200 mms., rotating with a speed of e.g. 3000 rev./min., by means of which an over modulation of, e.g. 2 kc./s. is attained. Each detector $1_1$–$1_{40}$ is associated with an amplifier $A_2$–$A_{40}$ transmitting this frequency band and feeding one of the 40 electro-luminescent cells $5_1$–$5_{40}$ of a strip 5, the geometrical disposiiton of which is similar to that of the receiver 1. The visible image is observed through a collimator lens 6, which serves as an ocular, and the rear surface 7 of the scanning mirror 3. The investigator perceives this image in the direction of the object in actual size or slightly magnified.

Figure 2:
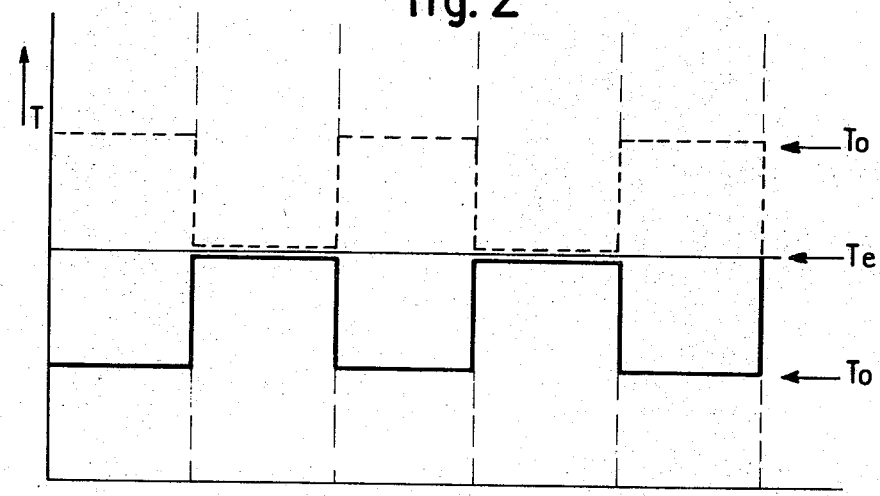
FIG. 2 illustrates the level of the signal obtained from the scanned object with respect to the reference signal from the modulator.

The cogged disc 4 is covered with a substance having an emission equal to that of a black body in the usual range of wavelength and is arranged in a constant-temperature space 8. This space has only two apertures, one in front of the detector 1 of sufficient size so as not to limit the extent of the useful beam for each detector, whereas the other is located behind the objective system 2 and has a size such that it constitutes the sole diaphragm for the beam, while the field diaphragm for each detector is formed by the sensitive surface of the detector itself. If, with a given detector element, the luminance transmitted by the object is equal to that of the space 8, no modulation occurs so that the detector does not emit an alternating signal: see curve T$e$ in FIG. 2 which shows the measured temperature as a function of time. Therefore, in the visible image displayed this point does not light up. But any other "hotter" or "colder" point will produce a signal of an intensity which increases with an increase in the absolute temperature difference value T$o$–T$e$ between the temperature T$o$, the apparent radiation from the object, and the temperature T$e$ of the space. The isotherm $To=Te$ corresponds to a black line in the visible image, which is otherwise completely visible.

In order to displace the isotherm, that is to say, to shift the value of T$e$, an attenuator 9 may be arranged in the path of the beam where $To>Te$, and where $To<Te$, a uniform luminance may be added to the incident light by means of a semi-permeable mirror 10. The added luminance is produced by an incandescent source 11 which is collimated by the lens 12.

In practice, these two steps are employed simultaneously, which provides a continuous interpolation between two levels.

The oscillation of the mirror 3 may be produced and maintained by various means, for example, by a friction-free magnetic system in which a small permanent magnet attached to the mirror is actuated by a stationary coil traversed by an alternating current of an appropriate frequency for the oscillating member, or by a system in which a small coil attached to the mirror and a stationary permanent magnet are employed.

The supply of the current maintaining the oscillations and the stabilisation of the amplitude of the oscillation may be controlled by photo-electro means, or by a stationary Hall-effect device actuated by the passage of the permanent magnet. These problems have been solved.

In a second embodiment of the device, the infrared image is reproduced as a visible image by means of a second strip of electro-luminescent diodes $5'_1$–$5'_{40}$ emitting a radiation of a wavelength differing from that of the first strip 5. In accordance with the values of the signals furnished by the infrared radiation from the object, a known electronic device provides a means for differentiating between the zones of a temperature lower and those of a temperature higher than the indicated temperature.

What is claimed is:
1. A radiation detection system for displaying temperature variations of an object comprising, a row of infrared radiation sensitive detectors, means for receiving and focusing infrared radiation from the object to be measured onto said detectors, and a modulator positioned in a constant temperature enclosure for interrupting the radiation to said detectors, said modulator alternately supplying a fixed quantity of infrared radiation to the detectors so that the detectors alternately receive the radiation to be measured and the radiation supplied by said modulator acting as a reference radiation source.

2. A system as claimed in claim 1 further comprising means for adding a given quantity of radiation to the radiation to be measured.

3. A system as claimed in claim 1 further comprising two groups of electroluminescent diodes for reproducing the infrared image in the form of a visible image, each group of diodes being chosen to emit radiation in a different spectral range and arranged to be selectively excited by the output from said detectors.

4. A system as claimed in claim 1 further comprising an optical attenuator arranged in the path of the infrared to be measured.

5. An infrared radiation detection system comprising, infrared radiation sensitive detector means, means for optically scanning a target area and focusing the received infrared radiation onto said detector means, and a reference source of infrared radiation comprising a modulator positioned within an enclosure maintained at a constant temperature, said modulator being interposed between said scanning means and said detector means for alternately interrupting the received target radiation and for supplying a fixed quantity of infrared radiation to the detector means whereby said detector means alternately receives the target radiation and the radiation from the reference radiation source.

6. A system as claimed in claim 5 wherein said modulator comprises a rotating member having alternate sections that are opaque and transparent to infrared radiation and wherein said member is coated with a substance having a radiation emission equal to that of a black body.

7. A system as claimed in claim 5 wherein said scanning means includes a mirror oscillated about an axis and said detector means including a row of infrared detector cells arranged to receive the scanned radiation from said mirror.

8. A system as claimed in claim 7 further comprising a row of electroluminescent diodes individually coupled to the outputs of said infrared cells for displaying the infrared image as a visible image, and means for optically scanning said diodes in synchronism with the scanning of the infrared cells.

9. A system as claimed in claim 8 wherein said diode scanning means comprises a second mirror mounted on the rear surface of the first mirror.

References Cited
UNITED STATES PATENTS

| | | |
|---|---|---|
| 3,082,325 | 3/1963 | Speyer. |
| 3,106,642 | 10/1963 | Shapiro. |
| 3,139,529 | 6/1964 | Stauffer. |
| 3,397,314 | 8/1968 | Weiner. |

ARCHIE R. BORCHELT, Primary Examiner

PO-1050
(5/69)

UNITED STATES PATENT OFFICE
CERTIFICATE OF CORRECTION

Patent No. 3,536,917          Dated October 27, 1970

Inventor(s) FRANCOIS DESVIGNES

It is certified that error appears in the above-identified patent and that said Letters Patent are hereby corrected as shown below:

Col. 4, line 28, after "infrared" insert -- radiation --;

Signed and sealed this 5th day January 1971.

(SEAL)
Attest:

Edward M. Fletcher, Jr.
Attesting Officer

WILLIAM E. SCHUYLER, JR.
Commissioner of Patents